United States Patent
Komazawa (10) Patent No.: US 8,498,000 B1
(45) Date of Patent: Jul. 30, 2013

(54) SPOOL CONTROL DEVICE AND NON-TRANSITORY COMPUTER READABLE MEDIUM

(71) Applicant: Fuji Xerox Co., Ltd, Tokyo (JP)

(72) Inventor: Hisao Komazawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/675,582

(22) Filed: Nov. 13, 2012

(30) Foreign Application Priority Data

Mar. 23, 2012 (JP) ................................. 2012-067438

(51) Int. Cl.
*G06F 15/00* (2006.01)
(52) U.S. Cl.
USPC ....................................................... 358/1.13
(58) Field of Classification Search
USPC ....................................................... 358/1.13
See application file for complete search history.

(56) References Cited

U.S. PATENT DOCUMENTS

2002/0063877 A1* 5/2002 Lucivero et al. ............. 358/1.13

FOREIGN PATENT DOCUMENTS

| JP | A-63-46534 | 2/1988 |
| JP | A-63-104284 | 5/1988 |

* cited by examiner

*Primary Examiner* — Saeid Ebrahimi Dehkordy
(74) *Attorney, Agent, or Firm* — Oliff & Berridge, PLC (57) ABSTRACT

A spool control device includes image data creation sections, a first measurement section, a spool section, a second measurement section, and a controller. Each of the image data creation sections interprets a page description language and creates a piece of image data acceptable by a printer. The first measurement section measures a creation speed with which the pieces of image data are created. The spool section spools the pieces of image data. The second measurement section measures an output speed with which the pieces of image data are output to the printer. The controller has first and second schemes of controlling an order in which the pieces of image data are written onto the spool section, selectively employs any of the first and second schemes on the basis of the creation speed and the output speed, and controls an order in which the pieces of image data are written.

4 Claims, 5 Drawing Sheets

SPOOL CONTROL DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-067438 filed Mar. 23, 2012.

BACKGROUND (i) Technical Field

The present invention relates to a spool control device and a non-transitory computer readable medium.

(ii) Related Art

In digital print systems, print data which is supplied from a host device and which is described in a page description language is interpreted (this process is also called raster image processing (RIP)), and is thereby converted to image data to be handled by a printer, such as a raster image, and the image data is supplied to the printer so as to be printed. Also, a configuration is well known in which a spool device, including a hard disk or the like serving as a storage medium, is provided between a RIP side and a printer side, so as to absorb a difference in processing speed between both sides and to enable the printer to stably operate.

In high-speed digital print systems available in recent years, plural RIP sections that perform RIP are provided and are caused to operate in parallel, so as to increase RIP speed. For example, processing operations are assigned to the individual RIP sections on the basis of processing units, such as pages or color planes in a page including yellow (Y), magenta (M), cyan (C), and black (K).

In some cases, inconvenience of delay in reading out image data from a spool device arises along with an increasing speed of printers. In order to address such delay, according to the related art, pieces of image data are written from a RIP side onto a spool device in an output order in which the pieces of image data are to be output to a printer, so that the pieces of image data are written in a physically continuous region of a hard disk in the spool device in the output order. Accordingly, in the case of reading out the pieces of image data from the hard disk to output them to the printer, the pieces of image data are read out in the order in which the pieces of image data have been stored in the physically continuous region of the hard disk. This suppresses the occurrence of inefficient head seek, and a theoretical readout speed is maximized.

SUMMARY

According to an aspect of the invention, there is provided a spool control device including image data creation sections, a first measurement section, a spool section, a second measurement section, and a controller. Each of the image data creation sections interprets a page description language and creates a piece of image data acceptable by a printer. The first measurement section measures a creation speed with which the pieces of image data are created by the image data creation sections. The spool section spools the pieces of image data created by the image data creation sections. The second measurement section measures an output speed with which the pieces of image data created by the image data creation sections and spooled by the spool section are output from the spool section to the printer. The controller has, as schemes of controlling an order in which the pieces of image data of individual processing units created by the image data creation sections are written onto the spool section, a first scheme of writing the pieces of image data of the individual processing units from the individual image data creation sections onto the spool section in an order in which the pieces of image data of the individual processing units are to be output to the printer, and a second scheme of writing the pieces of image data of the individual processing units created by the image data creation sections from the individual image data creation sections onto the spool section in an order in which the pieces of image data of the individual processing units have been created. The controller selectively employs any of the first scheme and the second scheme on the basis of the creation speed and the output speed, and controls an order in which the pieces of image data of the individual processing units are written from the image data creation sections onto the spool section in accordance with the employed scheme.

BRIEF DESCRIPTION OF THE DRAWINGS

An exemplary embodiment of the present invention will be described in detail based on the following figures, wherein.

DETAILED DESCRIPTION

Figure 1:
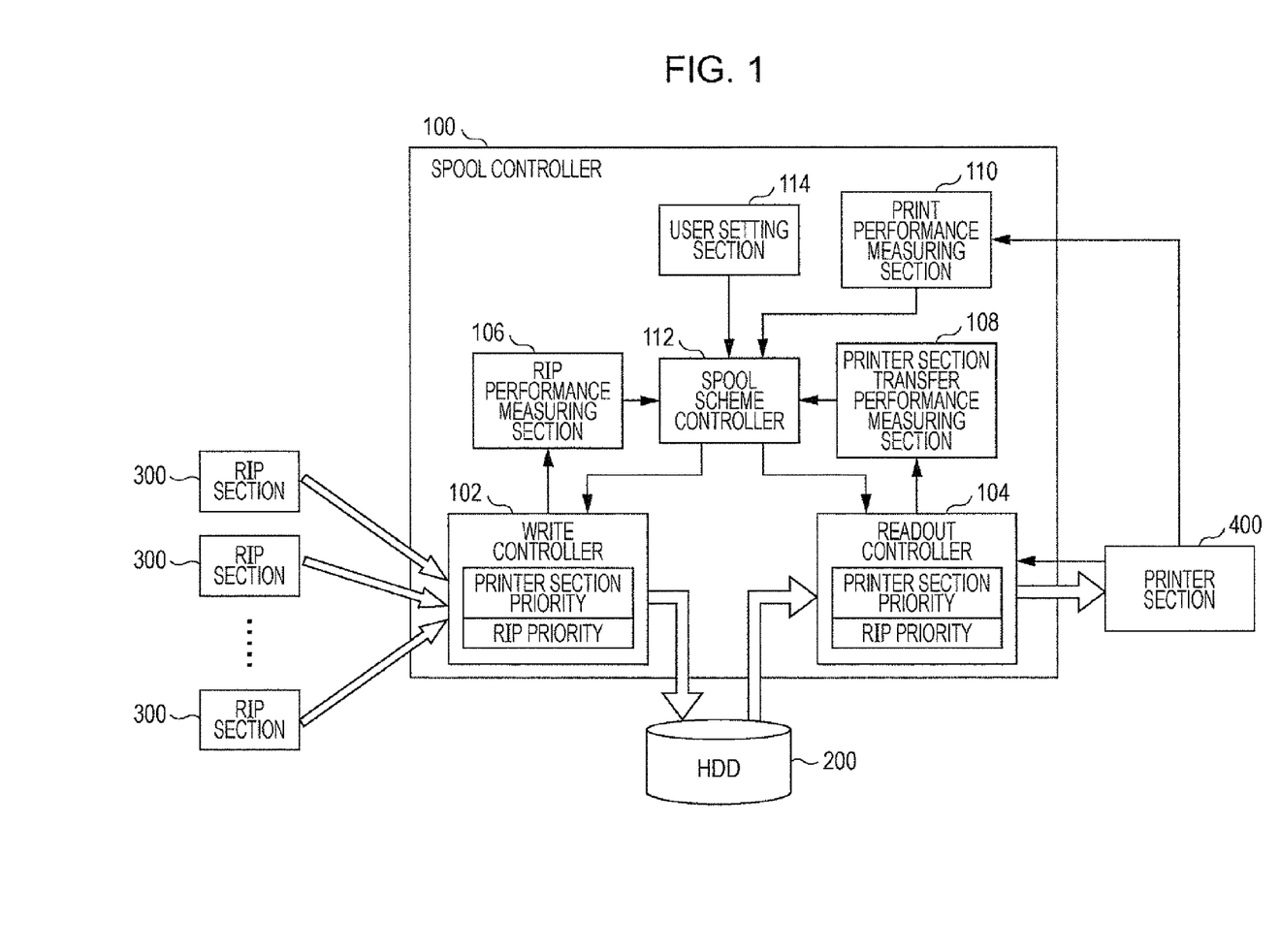
FIG. 1 is a diagram illustrating an example of a system configuration according to en exemplary embodiment.

FIG. 1 illustrates an example of a print system including a spool controller 100 according to an exemplary embodiment. This system includes the spool controller 100, a hard disk drive (HDD) 200, plural raster image processing (RIP) sections 300, and a printer section 400.

The printer section 400 is a device that prints image data on a medium, such as a sheet (a cut sheet or a continuous sheet), and is also called a printer. In the exemplary embodiment, the print scheme used by the printer section 400 is not specified, and any schemes including an inkjet scheme and an electrophotographic scheme may be used. Examples of a data format acceptable by the printer section 400 include a raster image format. The printer section 400 accepts image data of a specific acceptable data format, and controls an internal print mechanism in accordance with the image data, thereby printing the image data on a sheet.

Each of the RIP sections 300 performs RIP on a piece of print data which is described in a page description language and which is transmitted from a client to the print system, that is, performs a process of interpreting a piece of print data and converting it to a piece of image data acceptable by the printer section 400. In this example, the plural RIP sections 300 are operated in parallel, and thereby a RIP speed is increased. Specifically, a print data distribution unit (not illustrated) divides print data into processing units, such as pages or color planes of YMCK, and sequentially distributes the processing units to the individual RIP sections 300. Accordingly, the individual RIP sections 300 perform an interpretation process on the corresponding processing units distributed thereto. For example, after a certain RIP section 300 among the plural RIP sections 300 has completed processing on a processing unit, the print data distribution unit supplies the first processing unit among the unprocessed processing units at the time to the certain RIP section 300. In this way, the processing units are sequentially distributed to the individual RIP sections 300. When each of pages is regarded as a processing unit, the processing units are distributed in an order in which the pages are to be printed by the printer section 400 (in order of page number in normal printing, the order may be different from order of page number in the case of, for example, printing for book binding). In this case, the certain RIP section 300 to which a certain page has been distributed generates and outputs pieces of image data corresponding to YMCK planes of the certain page. In this case, the RIP section 300 may process the YMCK planes of the distributed page in parallel therein, in a software manner (for example, parallel execution of processes) or a hardware manner (for example, using plural built-in processors). When each of color planes is regarded as a processing unit, a distribution order is roughly a print order of pages, and is a print order of color planes in the printer section 400 in individual pages. For example, when a print order of color planes in the printer section 400 is K, C, M, Y, distribution may be performed in the order of K, C, M, Y of the first page, and K, C, M, Y of the second page.

Pieces of image data of individual processing units output from the individual RIP sections 300 are supplied to the spool controller 100. More specifically, each of the RIP sections 300 transmits a write request to the spool controller 100 upon completing creation of a piece of image data of a processing unit distributed thereto, and transfers the piece of image data to the spool controller 100 upon receiving a response indicating permission for the write request.

In the spool controller 100, a write controller 102 performs control to write pieces of image data created by the individual RIP sections 300 onto the HDD 200. More specifically, the write controller 102 has two schemes of writing pieces of image data received from the individual RIP sections 300 onto the HDD 200 (that is, spool schemes): a printer section priority scheme and a RIP priority scheme. The write controller 102 writes pieces of image data received from the individual RIP sections 300 onto the HDD 200 in accordance with a scheme specified by a spool scheme controller 112 among the two schemes.

Figure 2:
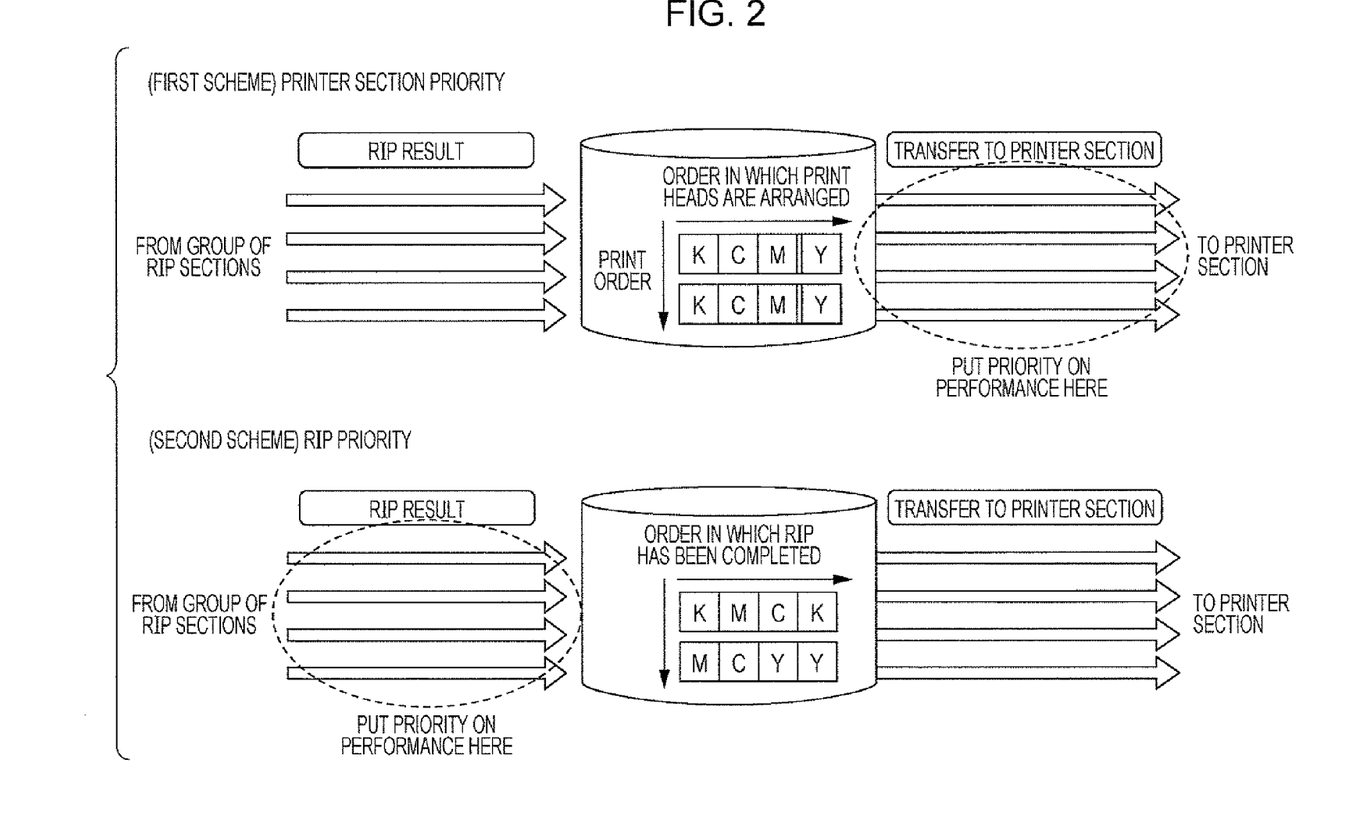
FIG. 2 is a diagram describing two spool schemes.

The two schemes will be described below with reference to FIG. 2.

The first scheme, the printer section priority scheme, is a scheme of writing pieces of image data of individual processing units in a continuous physical storage region (sector) in the HDD 200 in an order in which the pieces of image data are to be read out (used) by the printer section 400. That is, in this scheme, just after a region in which the piece of image data of the processing unit to be read out n-th (n is a natural number) is written in the HDD 200 in a direction in which readout progresses (typically, a direction in which a disk rotates), the piece of image data of the processing unit to be read out n+1-th is written. In the example illustrated in FIG. 2, pieces of image data of individual color planes in one page are continuously written in the order of K, C, M, Y in a print order of the color planes of the printer section 400 (for example, in an order in which print heads or photoconductors for individual color planes are arranged viewed from the front end of a sheet in its progress direction), and pieces of data of page units are continuously written in the print order of individual pages.

Hereinafter, an overall order including a print order for pages and a print order for color planes in individual pages is referred to as a "print order". That is, pieces of image data of individual color planes of individual pages are input to the printer section 400 in the "print order".

The printer section priority scheme is a scheme that has been used since the past time when the speed with which image data is read out from the HDD 200 was a bottleneck of a processing speed of an entire system.

In the printer section priority scheme, even if a piece of image data of a processing unit to be printed later (called "processing unit B") is completed earlier than a piece of image data of a processing unit to be printed earlier (called "processing unit A"), the piece of image data of the processing unit B may be written only after the piece of image data of the processing unit A has been written on the HDD 200. In other words, with this scheme, when the write controller 102 receives a write request for writing the piece of image data of the processing unit B from one of the RIP sections 300, the write controller 102 waits to issue write permission in response to the write request until the piece of image data of the preceding processing unit A has been written. Write of a piece of image data of a certain processing unit is permitted after write of a piece of image data of the preceding processing unit (or pieces of image data of all the preceding processing units) has been completed.

Pieces of image data of individual processing units that have been written with the printer section priority scheme are continuously read out by a readout controller 104 in an order in which the pieces of image data are arranged in the HDD 200, and are supplied to the printer section 400.

The second scheme, the RIP priority scheme, is a scheme of writing pieces of image data of individual processing units in an order in which the pieces of image data have been created. The RIP priority scheme illustrated in FIG. 2 is an example of a case where RIP is performed in parallel in units of pages and in units of color planes. In this example, pieces of image data of K, M, and C planes of the first page are sequentially written, and then pieces of image data of K, M, and C planes of the second page are sequentially written. After that, a piece of image data of a Y plane of the first page is written, and then a piece of image data of a Y plane of the second page is written.

In the RIP priority scheme, the write controller 102 gives write permission to the individual RIP sections 300 in an order in which write requests arrive from the individual RIP sections 300, regardless of the print order of processing units. Thus, each of the RIP sections 300 is capable of writing a piece of image data of a processing unit created thereby without waiting for the completion of creation and write of a piece of image data of a processing unit that is to be printed earlier.

The RIP priority scheme is a scheme used for handling a case where a RIP speed is a bottleneck of processing in the entire system.

In the RIP priority scheme, pieces of image data of individual processing units in the HDD 200 are not arranged in a print order. Thus, at the time of readout, it is necessary to search for and read out the pieces of image data of the individual processing units in the print order. For this purpose, the write controller 102 transmits, to the readout controller 104, write address information indicating sites (physical storage regions) in the HDD 200 where pieces of image data of individual processing units have been written (for example, a site where a piece of image data of the x-th processing unit in a print order has been written). The readout controller 104 specifies the storage regions of the processing units to be read out in the print order with reference to the write address information, reads out the pieces of image data from the storage regions, and transfers the pieces of image data to the printer section 400.

Referring back to FIG. 1, the readout controller 104 in the spool controller 100 reads out, from the HDD 200, pieces of image data of individual processing units in the print order, and transfers the pieces of image data to the printer section 400 in a readout order. For example, the printer section 400 transmits a readout request to the readout controller 104 every time the printer section 400 becomes capable of accepting the piece of image data of the next processing unit. In response to the readout request, the readout controller 104 reads out the piece of image data of the next processing unit and transmits it to the printer section 400. Here, as described above, the readout scheme used by the readout controller 104 varies depending on the write scheme for the HDD 200, that is, the printer section priority scheme or the RIP priority scheme. In the case of the printer section priority scheme, the readout controller 104 reads out the pieces of image data in an order in which the pieces of image data are arranged in the HDD 200. In the case of the RIP priority scheme, the readout controller 104 specifies, with reference to write address information, the sites in which the pieces of image data are written, and reads out the pieces of image data from the sites.

In this print system, a creation speed with which pieces of image data are created by all the plural RIP sections 300 and a transfer speed with which the pieces of image data are transferred to the printer section 400 are measured, and a spool scheme is selected in accordance with the measurement values. A RIP performance (speed) measuring section 106 measures the creation speed, and a printer section transfer performance (speed) measuring section 108 measures the transfer speed.

The RIP performance measuring section 106 obtains an evaluation value representing a creation speed with which pieces of image data are created, that is, the RIP performance of this print system, in accordance with the number of write requests that are transmitted from all the plural RIP sections 300 to the write controller 102 per unit time, for example. Here, each of the RIP sections 300 transmits one write request to the write controller 102 every time the RIP section 300 has completed creation of a piece of image data of a processing unit distributed thereto (for example, a page). For example, it is assumed that processing units that are distributed to the individual RIP sections 300 are pages, and that write requests regarding twenty pages in total are received from the RIP sections 300 for one second. In this case, the RIP performance for one second is twenty pages per second. The RIP loads of the individual processing units vary, and thus the RIP performance may change momentarily.

The printer section transfer performance measuring section 108 obtains an evaluation value representing a transfer speed with which piece of image data are transferred to the printer section 400, that is, the printer section transfer performance of this print system, in accordance with the number of readout requests that are transmitted from the printer section 400 to the readout controller 104. For example, it is assumed that processing units are pages, and that readout requests regarding eighteen pages are received from the printer section 400 for one second. In this case, the printer section transfer performance for one second is eighteen pages per second. The printer section transfer performance may also change over time.

In the example illustrated in FIG. 1, the spool controller 100 includes a print performance measuring section 110 that measures the print speed performance of the printer section 400. For example, the print performance measuring section 110 counts the number of print completion notifications for individual pages received from the printer section 400, and thereby obtains the number of pages for which the printer section 400 performs printing per unit time. The number of pages is regarded as an actual measurement value representing the print performance regarding speed. In a case where the printer section 400 connected to the spool controller 100 performs printing at a substantially constant speed and where the print speed is known, the print performance measuring section 110 is not necessary, and information indicating print performance regarding speed may be transmitted to the spool scheme controller 112.

Here, the length of an observation period in which printer section transfer performance (and print performance) is measured may be set on a user side. These performances are measured using the number of processing units (typically, pages) that are processed or transferred in the set observation period. If the observation period is too short or too long, excessive reaction to slight fluctuation or too slow reaction to fluctuation may occur. An appropriate length of the observation period may vary depending on the types of the RIP sections 300 and the printer section 400 constituting the print system, the individual differences therebetween, or print data to be printed. Thus, the user side may determine an appropriate observation period in accordance with an experience in actually operating this system, and may set the observation period for the spool controller 100.

A user setting section 114 is a processing section that accepts various settings regarding the spool controller 100, such as the observation period.

Figure 3:
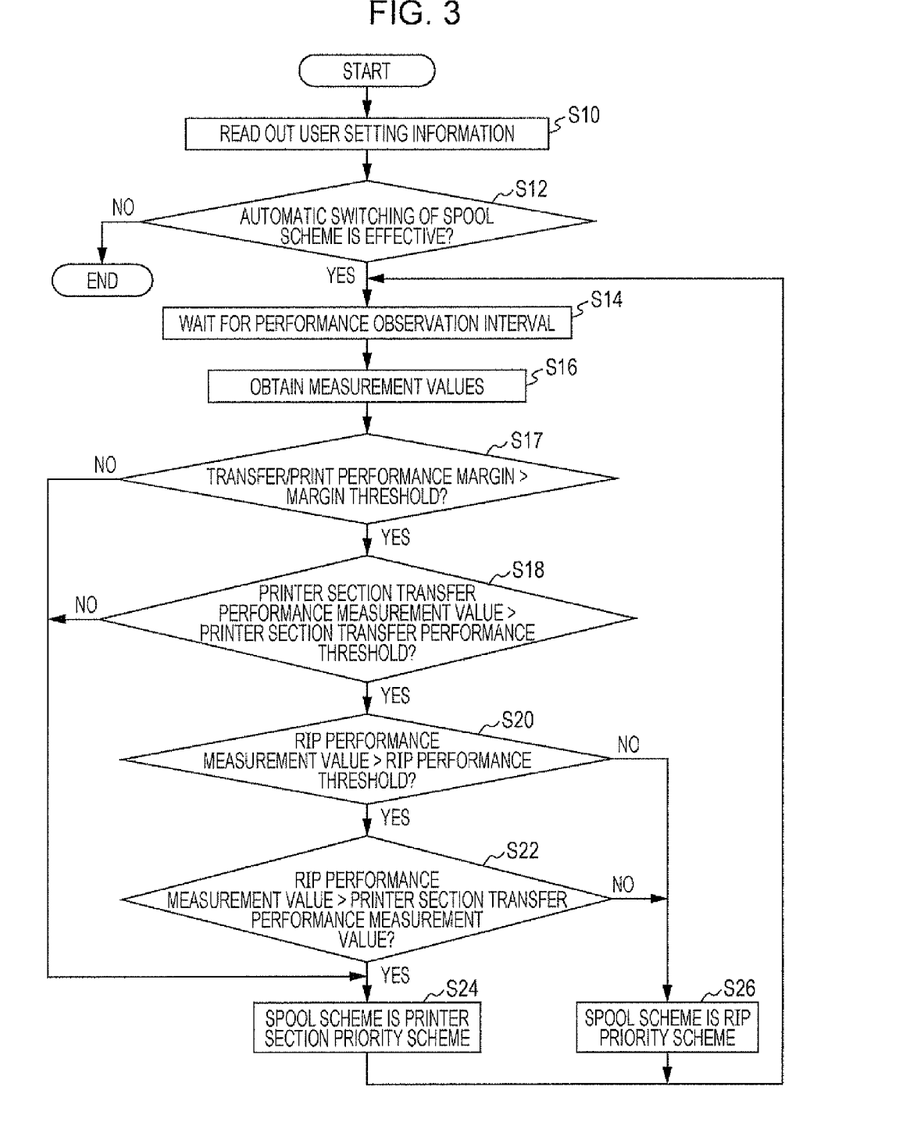
FIG. 3 is a diagram illustrating an example of a process procedure of a spool scheme controller.

The spool scheme controller 112 determines the spool scheme to be applied to the HDD 200 in accordance with the performance values obtained through measurements performed by the RIP performance measuring section 106, the printer section transfer performance measuring section 108, and the print performance measuring section 110. An example of a process procedure of the spool scheme controller 112 is illustrated in FIG. 3.

Figure 4:
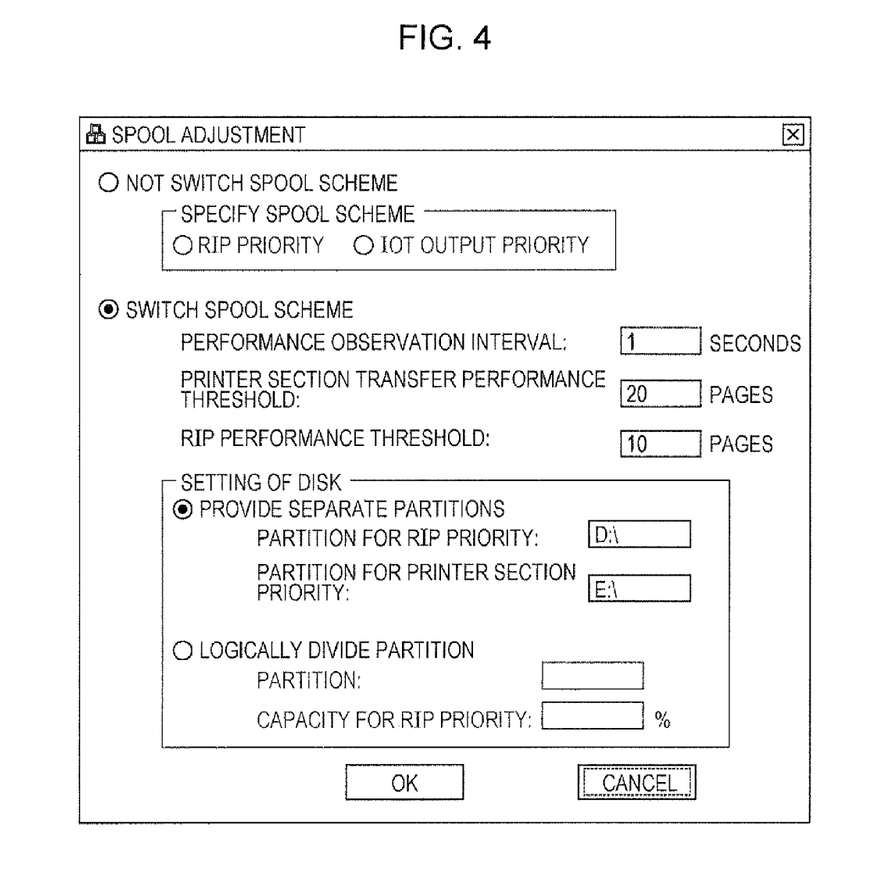
FIG. 4 is a diagram illustrating an example of a user setting screen regarding spool.

In this example, the spool scheme controller 112 first obtains user setting information that is set in the use setting section 114 by a user. FIG. 4 illustrates an example of an input screen for user setting information. In this example, the user is allowed to alternatively select any of "not switch spool scheme" and "switch spool scheme" using a radio button. The former is an option for not performing automatic switching of a spool scheme according to the exemplary embodiment. If this option is selected, the spool scheme is fixed regardless of the operation status of the print system. The user may be allowed to specify the RIP priority scheme or the printer section priority scheme as a fixed spool scheme.

On the other hand, "switch spool scheme" is an option for dynamically switching a spool scheme in accordance with momentarily changing performance measurement values generated by the RIP performance measuring section 106, the printer section transfer performance measuring section 108, and so forth. In the example illustrated in FIG. 4, if this option is selected, the values of "performance observation interval", "printer section transfer performance threshold", and "RIP performance threshold" may be specified. "Performance observation interval" is the length of the observation period in which the above-described performances are observed.

"Printer section transfer performance threshold" is a threshold serving as a reference for determining whether or not the printer section transfer performance (speed) measured by the printer section transfer performance measuring section 108 is sufficient. If a measurement value of the printer section transfer performance is equal to or smaller than "printer section transfer performance threshold", that means the transfer performance of image data from the spool controller 100 to the printer section 400 is insufficient (a transfer speed is slow). Thus, it is necessary to enhance the transfer performance. In such a case, the printer section priority scheme is employed.

"RIP performance threshold" is a threshold indicating the RIP performance (speed) as a reference for switching the spool scheme to the RIP priority scheme.

For example, if a processing unit A (for example, a page) with a very large load of RIP is assigned to one of the RIP sections 300, it takes long time for the RIP section 300 to perform RIP on the processing unit A. If the printer section priority scheme is employed here as a spool scheme, even if another one of the RIP sections 300 has completed creation of a piece of image data of a processing unit B that is to be printed later than the processing unit A, spooling of the piece of image data of the processing unit B in the HDD 200 is permitted only after the piece of image data of the processing unit A has been completed. In this way, when the printer section priority scheme is employed, a delay in RIP for a certain processing unit causes a delay in RIP for a subsequent processing unit. Such a delay in RIP causes the above-described case where image data is not supplied to the printer section 400 at appropriate timing. The RIP performance threshold is a threshold for detecting such a delay in RIP. In the exemplary embodiment, when there is sufficient time for transferring image data from the spool controller 100 to the printer section 400 and when the RIP performance represents the RIP performance threshold or less, it is determined that inconvenience caused by a delay in RIP is likely to become apparent, and the RIP priority scheme is employed as a spool scheme.

An appropriate RIP performance threshold depends on system requirements, such as the RIP sections 300, the spool controller 100, and a communication path therebetween, and may vary depending on the content of target print data. Thus, in the example illustrated in FIG. 4, a user side determines an appropriate threshold in accordance with an experience in actually operating this system, and is allowed to set the threshold for the spool controller 100.

In the control according to the exemplary embodiment, a threshold called a "margin threshold" is used in addition to "printer section transfer performance threshold" and "RIP performance threshold" illustrated in FIG. 4. "Margin threshold" is a threshold for a margin of the printer section transfer performance (speed) measured by the printer section transfer performance measuring section 108 with respect to the print performance (speed) of the printer section 400 (allowance, more specifically "printer section transfer performance–print performance", hereinafter referred to as "transfer/print performance margin"). For example, if this margin has a negative value, supply of image data does not keep up with printing, which leads to inconvenience, for example, the printer section 400 stops. A transfer/print performance margin, which is a result obtained by subtracting print performance from printer section transfer performance, is an average value in the time period set as "performance observation interval". Thus, an instantaneous value of a margin of a transfer speed and a print speed may be smaller than the transfer/print performance margin, which is time average, to some extent. For example, some of recent high-speed print systems are capable of performing printing of several tens of pages in one second. If the margin has a negative value or a value close to zero even for several tens of milliseconds, such inconvenience may occur. The margin threshold is a lower-limit value of the transfer/print performance margin that is necessary for realizing stable printing by avoiding such an instantaneous situation. Such a lower-limit value is affected by complicated requirements of the system, such as the spool controller 100, the printer section 400, and the communication path therebetween, and thus it is often difficult to obtain the lower-limit value in advance through calculation. Thus, the user side may determine an appropriate margin threshold in accordance with an experience in actually operating this system, and may be allowed to set the margin threshold for the spool controller 100 via the user interface (UI) screen illustrated in FIG. 4.

User setting information input by the user through the setting screen illustrated in FIG. 4 is stored in the spool controller 100, and is read out in step S10 in FIG. 3 at the time of starting processing of print data.

After the readout in step S10, it is determined in step S12 whether or not automatic switching of a spool scheme (option "switch spool scheme") is effective (is selected) in the read out user setting information. If automatic switching of a spool scheme is not effective, the spool scheme controller 112 notifies the write controller 102 and the readout controller 104 of the fixed spool scheme (RIP priority scheme or printer section priority scheme) that is specified in the user setting information, and ends the process.

On the other hand, if automatic switching of a spool scheme is effective, the process proceeds to step S14, where the spool scheme controller 112 waits for a time period corresponding to the performance observation interval specified in the user setting information. The RIP performance, printer section transfer performance, and print performance of processing of print data which has already started are measured in the interval by the RIP performance measuring section 106, the printer section transfer performance measuring section 108, and the print performance measuring section 110. After the waiting time, the spool scheme controller 112 obtains measurement values of the performances in step S16.

After step S16, the spool scheme controller 112 determines in step S17 whether or not the printer section transfer performance measurement value measured by the printer section transfer performance measuring section 108 is larger than the print performance measurement value measured by the print performance measuring section 110 by a margin threshold or more. That is, in step S17, the spool scheme controller 112 determines whether or not a transfer/print performance margin, which is a result obtained by subtracting the print performance measurement value from the printer section transfer performance measurement value (that is, "printer section transfer performance measurement value–print performance measurement value"), is larger than the margin threshold.

If the determination result in step S17 is "NO" (transfer/print performance margin≤threshold), the spool scheme controller 112 employs the printer section priority scheme as a spool scheme in step S24. This is because it is necessary to enhance the printer section transfer performance (at least avoid degradation).

If the determination result in step S17 is "YES" (transfer/print performance margin>margin threshold), the spool scheme controller 112 compares the printer section transfer performance measurement value with the printer section transfer performance threshold specified in the user setting information in step S18. As a result of the comparison, if the printer section transfer performance measurement value is equal to or smaller than the printer section transfer performance threshold ("NO" in step S18), the spool scheme controller 112 determines in step S24 that the printer section priority scheme is an appropriate spool scheme. This is because, if the printer section transfer performance measurement value is equal to or smaller than the printer section transfer performance threshold, inconvenience caused by a delay in transferring image data from the spool controller 100 to the printer section 400 is more likely to occur, and it is necessary to increase the printer section transfer speed. At this time, if the current spool scheme is the RIP priority scheme, the spool scheme controller 112 transmits an instruction to switch the spool scheme to the printer section priority scheme to the write controller 102 and the readout controller 104. The spool scheme controller 112 does not transmit such an instruction if the current spool scheme is the printer section priority scheme.

If it is determined in step S18 that the printer section transfer performance measurement value is larger than the printer section transfer performance threshold, the spool scheme controller 112 compares the RIP performance measurement value with the RIP performance threshold specified in the user setting information in step S20. As a result of the comparison, if it is determined that the RIP performance measurement value is equal to or smaller than the RIP performance threshold ("NO" in step S20), the spool scheme controller 112 determines that the RIP priority scheme is an appropriate spool scheme, and transmits an instruction to switch the spool scheme to the RIP priority scheme to the write controller 102 and the readout controller 104 in step S26. If the printer section priority scheme is employed, it is necessary to write pieces of image data of individual processing units on the HDD 200 in a print order, and thus a delay in writing may occur due to a processing unit having a heavy processing load, as described above. This leads to a delay in start and completion of RIP of a subsequent processing unit, resulting in degradation of a measurement value of RIP performance (speed). If the measurement value of RIP performance is equal to or smaller than the RIP performance threshold, that means the RIP performance is quite low, and the possibility that image data is supplied to the printer section 400 after appropriate timing becomes too high to ignore. Thus, in this case, it is necessary to increase the RIP speed, and the RIP priority scheme is employed as a spool scheme.

If it is determined in step S20 that the RIP performance measurement value is larger than the RIP performance threshold ("YES" in step S20), the spool scheme controller 112 further compares the RIP performance measurement value with the printer section transfer performance measurement value in step S22. As a result of the comparison, the spool scheme controller 112 switches the spool scheme to enhance the performance of one of RIP and printer section transfer having lower performance (lower speed). That is, if the printer section transfer performance measurement value is smaller than the RIP performance measurement value ("YES" in step S22), the spool scheme controller 112 switches the spool scheme to the printer section priority scheme in step S24. If the printer section transfer performance measurement value is equal to or larger than the RIP performance measurement value ("NO" in step S22), the spool scheme controller 112 switches the spool scheme to the RIP priority scheme in step S26.

The processing loop of steps S14 to S26 is repeated at the performance observation intervals.

The waiting time in step S14 may be a time period different from the performance observation interval (for example, a time period shorter than the performance observation interval). Every time the waiting time elapses, RIP performance, printer section transfer performance, and print performance may be obtained on the basis of the number of write/readout requests and the number of pages printed during a time period between a certain time point when the waiting time has elapsed and a time point before the certain time point by the performance observation interval.

Although not illustrated in FIG. 3, in the case of automatically switching a spool scheme, a default value of the spool scheme is the printer section priority scheme, so that the printer section priority scheme is employed at the start of the processing of print data. The RIP performance degrades to be equal to or lower than the threshold when a processing unit with an exceptionally heavy RIP load is processed under the environment of the printer section priority scheme. In this case, the spool scheme may be switched to the RIP priority scheme only when the condition that the transfer/print performance margin is sufficient (larger than the margin threshold) is satisfied. At the time of performing the switching, the printer section transfer performance has a margin, and thus the seek time in the HDD 200 for reading out pieces of image data of individual processing units in a print order using the RIP priority scheme is absorbed. During a time period in which the transfer/print performance margin is determined to be larger than the margin threshold in step S17, the printer section transfer performance is sufficient compared with the print performance, and thus intermittent printing does not occur.

Hereinafter, behavior in the above-described spool scheme control will be described using specific examples. In the following specific examples, it is assumed that the performance observation interval is one second, the printer section transfer performance threshold is twenty pages, the RIP performance threshold is ten pages. Also, it is assumed that the condition that the transfer/print performance margin is larger than the margin threshold (that is, "YES" in step S17) is satisfied.

In a first example, it is assumed that the RIP performance measurement value measured at the performance observation interval is nine pages, and the printer section transfer performance measurement value is nine pages. In this case, the printer section transfer performance measurement value of nine pages is under the printer section transfer performance threshold of twenty pages. Thus, the determination result in step S18 is "NO", and the printer section priority scheme is selected in step S24.

In a second example, it is assumed that the RIP performance measurement value is nine pages, and the printer section transfer performance measurement value is twenty-five pages. In this case, the determination result in step S18 is "YES", and the process proceeds to step S20. Since the RIP performance measurement value of nine pages is under the RIP performance threshold of ten pages, the determination result in step S20 is "NO". Accordingly, the RIP priority scheme is selected in step S26.

In a third example, it is assumed that the RIP performance measurement value is twenty pages, and the printer section transfer performance measurement value is twenty-five pages. In this case, the determination result in step S18 is "YES", and the process proceeds to step S20. Since the RIP performance measurement value of twenty pages is over the RIP performance threshold of ten pages, the determination result in step S20 is "YES", and the process proceeds to step S22. Since the RIP performance measurement value of twenty pages is under the printer section transfer performance measurement value of twenty-five pages, the determination result in step S22 is "NO", and the RIP priority scheme is selected in step S26.

In a fourth example, it is assumed that the RIP performance measurement value is thirty pages, and the printer section transfer performance measurement value is twenty-five pages. In this case, the determination result in step S18 is "YES", and the process proceeds to step S20. The determination result in step S20 is "YES", and the process proceeds to step S22. Since the RIP performance measurement value of thirty pages is over the printer section transfer performance measurement value of twenty-five pages, the determination result in step S22 is "YES", and the printer section priority scheme is selected in step S24.

In this way, in the spool scheme switching control according to the exemplary embodiment, a spool scheme is switched in accordance with a processing status of print data, so that the probability of occurrence of intermittent printing in the printer section 400 decreases.

Furthermore, the spool controller 100 according to the exemplary embodiment measures RIP performance, printer section transfer performance, and print performance, and performs control in accordance with the measurement values. Thus, even if the devices connected to the spool controller 100, such as the RIP sections 300 and the printer section 400, change, the spool controller 100 is capable of handling the newly connected devices without changing the operation.

With the printer section priority scheme, pieces of image data are written in a print order in a continuous region of the HDD 200 on which nothing has been written, and the written pieces of image data are read out in the print order. Thus, even if write and read operations are repeated, a continuous free region of a sufficient size constantly exists in the HDD 200, fragmentation of the HDD 200 does not occur, and write and read operations using the printer section priority scheme are continued in a stable manner. In contrast, with the RIP priority scheme, a write order and a readout order of pieces of image data with respect to the HDD 200 do not match, which may cause fragmentation of the HDD 200. The printer section priority scheme requires a continuous storage region of a sufficiently large size, and thus may not be applicable to the HDD 200 which is fragmented. In order to use the fragmented HDD 200 with the printer section priority scheme, it is necessary to perform a defragmentation process on the HDD 200, which takes much time. Thus, after the spool scheme has been changed from the printer section priority scheme to the RIP priority scheme, using the HDD 200 fragmented by the RIP priority scheme by switching the spool scheme to the printer section priority scheme is impossible. Even if it is possible, it takes time to perform switching.

Figure 5:
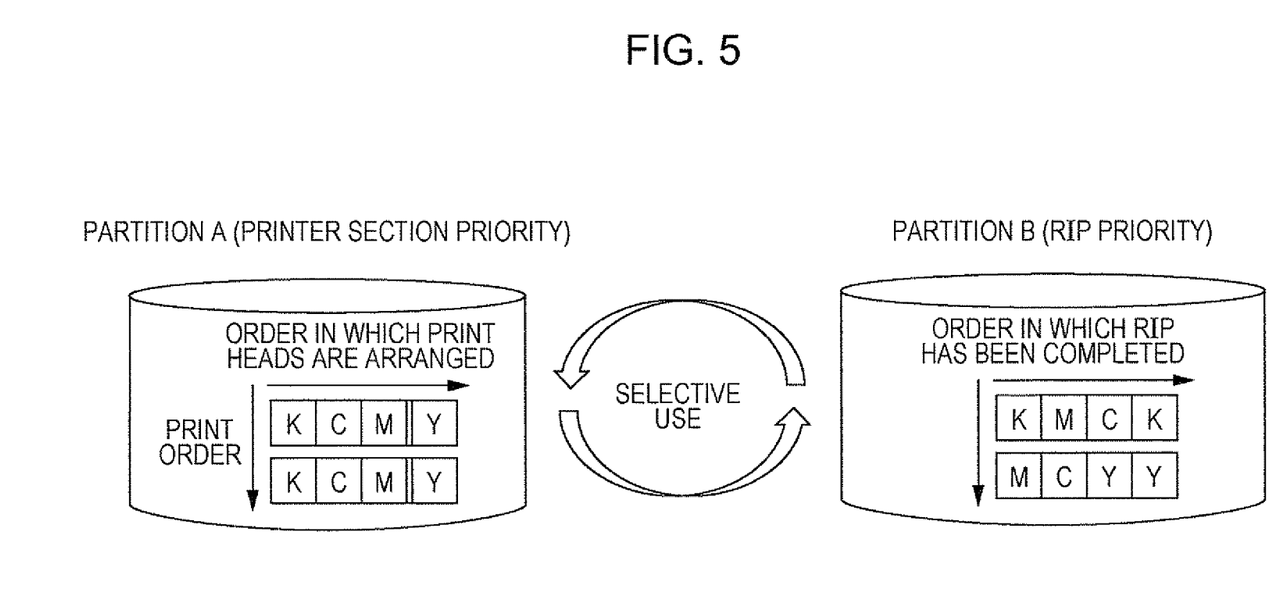
FIG. 5 is a diagram describing an example of providing a partition dedicated to a printer section priority scheme and a partition dedicated to a RIP priority scheme in an HDD.

As a modification example of handling such a case, two physically separate disk regions (partitions) may be set in the HDD 200 as illustrated in FIG. 5, and one of them may be used as a region dedicated to the RIP priority scheme, and the other may be used as a region dedicated to the printer section priority scheme. That is, in this modification example, the write controller 102 and the readout controller 104 perform read and write operations on the disk region dedicated to the printer section priority scheme during a time period in which the printer section priority scheme is selected, and perform read and write operations on the disk region dedicated to the RIP priority scheme during a time period in which the RIP priority scheme is selected. There is a time lag from when image data is written on the HDD 200 to when the image data is read out. Thus, even after receiving an instruction to switch the spool scheme from the spool scheme controller 112, the readout controller 104 reads out all the pieces of image data written in the disk region dedicated to the currently executed spool scheme before switching (the sites in the HDD 200 where individual pieces of image data are written are notified from the write controller 102, and thus the readout controller 104 is capable of reading out the image data), and then starts reading out image data from the disk region dedicated to the scheme selected through the switching.

The disk region dedicated to the RIP priority scheme and the disk region dedicated to the printer section priority scheme may be realized as individual hard disk drives, or may be realized as continuous physical storage regions that are separately obtained in the same drive. When it is impossible to provide two partitions dedicated to the RIP priority scheme and the printer section priority scheme in the HDD 200, a partition specified by a user may be logically divided into two regions, which may be used as a region dedicated to the RIP priority scheme and a region dedicated to the printer section priority scheme. In this case, the ratio of the region dedicated to the RIP priority scheme and the ratio of the region dedicated to the printer section priority scheme with respect to the partition may be specified by the user.

In the lower half portion of the setting screen illustrated in FIG. 4, there are provided buttons for selecting any one of separately providing partitions dedicated to the individual schemes in the HDD 200 ("provide separate partitions") and logically dividing one partition into two regions and regarding the two regions as regions dedicated to the individual schemes ("logically divide partition"). If the former is selected, the user is allowed to specify which partition is to be used for which scheme. If the latter is selected, the user is allowed to specify the partition to be used for spool and the percentage of the partition to be used for a logical region for the RIP priority scheme (or the printer section priority scheme).

The inside of the above-described spool controller 100 is realized by, for example, causing a general-purpose computer to execute a program representing the processes of individual functional modules of the spool controller 100. Here, the computer has a circuit configuration as hardware in which a microprocessor such as a central processing unit (CPU), a memory (primary storage) such as a random access memory (RAM) and a read only memory (ROM), a hard disk drive (HDD) controller that controls an HDD, various input/output (I/O) interfaces, and a network interface that performs control for connecting to a network, such as a local area network, are connected to one another via a bus. Also, a disc drive for reading data from and/or writing data on a portable disc recording medium, such as a compact disc (CD) or a digital versatile disc (DVD), a memory reader/writer for reading data from and/or writing data on a portable nonvolatile recording medium of various standards, such as a flash memory, or the like may be connected to the bus via, for example, an I/O interface. The program describing the processes performed by the above-described individual functional modules is stored in a fixed storage device, such as a hard disk drive, via a recording medium such as a CD or DVD, or via a communication medium such as a network, and is installed into the computer. When the program stored in the fixed storage device is read out to the RAM and is executed by the microprocessor such as a CPU, the above-described functional modules are realized. The computer in which the spool controller 100 is loaded may be included in any of the RIP sections 300 or in the printer section 400. Alternatively, the spool controller 100 may be loaded separately from these devices.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A spool control device comprising:
   image data creation sections each of which interprets a page description language and creates a piece of image data acceptable by a printer;
   a first measurement section that measures a creation speed with which the pieces of image data are created by the image data creation sections;
   a spool section that spools the pieces of image data created by the image data creation sections;
   a second measurement section that measures an output speed with which the pieces of image data created by the image data creation sections and spooled by the spool section are output from the spool section to the printer; and
   a controller that has, as schemes of controlling an order in which the pieces of image data of individual processing units created by the image data creation sections are written onto the spool section, a first scheme of writing the pieces of image data of the individual processing units from the individual image data creation sections onto the spool section in an order in which the pieces of image data of the individual processing units are to be output to the printer, and a second scheme of writing the pieces of image data of the individual processing units created by the image data creation sections from the individual image data creation sections onto the spool section in an order in which the pieces of image data of the individual processing units have been created, that selectively employs any of the first scheme and the second scheme on the basis of the creation speed and the output speed, and that controls an order in which the pieces of image data of the individual processing units are written from the image data creation sections onto the spool section in accordance with the employed scheme.

2. The spool control device according to claim 1, wherein the controller employs the second scheme in a case where the output speed is higher than a preset first threshold and the creation speed is equal to or lower than a preset second threshold.

3. The spool control device according to claim 2, wherein, in a case where the output speed is higher than the preset first threshold and the creation speed is higher than the preset second threshold, the controller employs the second scheme if the output speed is higher than the creation speed, and employs the first scheme otherwise.

4. A non-transitory computer readable medium storing a program causing a computer to function as:
   image data creation sections each of which interprets a page description language and creates a piece of image data acceptable by a printer;
   a first measurement section that measures a creation speed with which the pieces of image data are created by the image data creation sections;
   a second measurement section that measures an output speed with which the pieces of image data created by the image data creation sections and spooled by a spool section are output from the spool section to the printer; and
   a controller that has, as schemes of controlling an order in which the pieces of image data of individual processing units created by the image data creation sections are written onto the spool section, a first scheme of writing the pieces of image data of the individual processing units from the individual image data creation sections onto the spool section in an order in which the pieces of image data of the individual processing units are to be output to the printer, and a second scheme of writing the pieces of image data of the individual processing units created by the image data creation sections from the individual image data creation sections onto the spool section in an order in which the pieces of image data of the individual processing units have been created, that selectively employs any of the first scheme and the second scheme on the basis of the creation speed and the output speed, and that controls an order in which the pieces of image data of the individual processing units are written from the image data creation sections onto the spool section in accordance with the employed scheme.

* * * * *